March 23, 1943.  M. M. BERRY  2,314,683
PISTON SEALING ASSEMBLY
Filed March 3, 1941  2 Sheets-Sheet 2
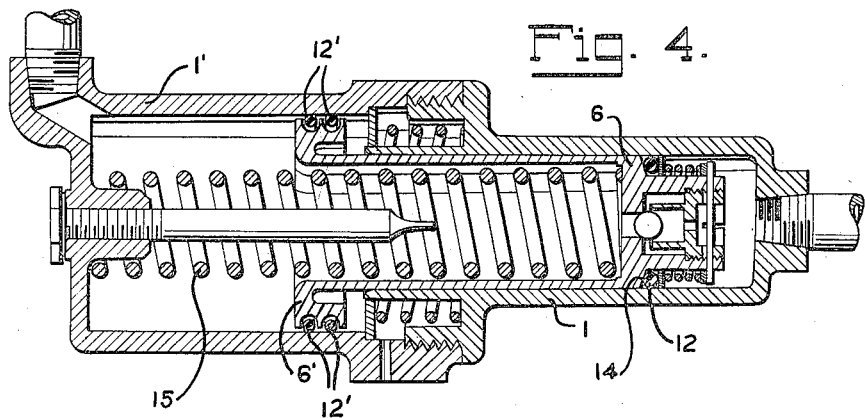
Fig. 4.
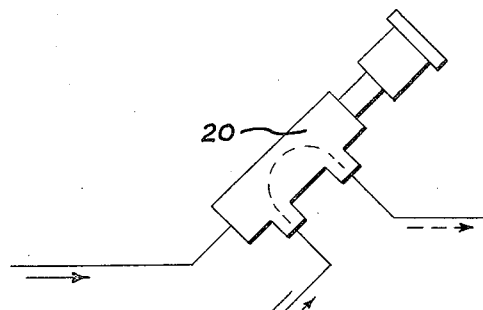
Fig. 5.
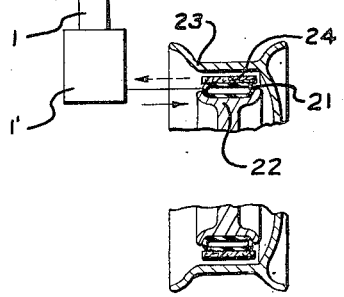
Inventor
Mitchell M. Berry
By Reynolds & Beach
Attorneys Patented Mar. 23, 1943

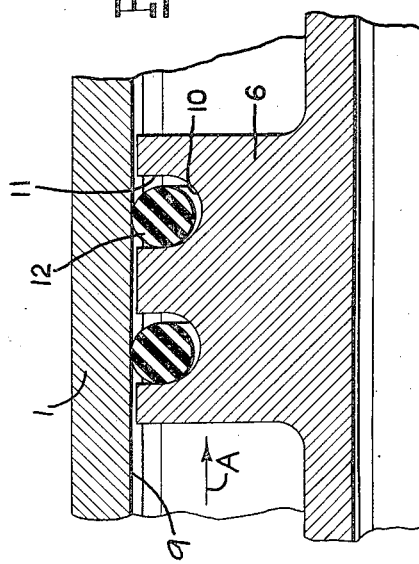
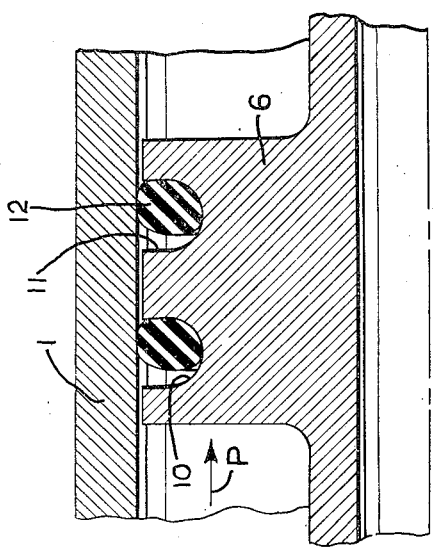
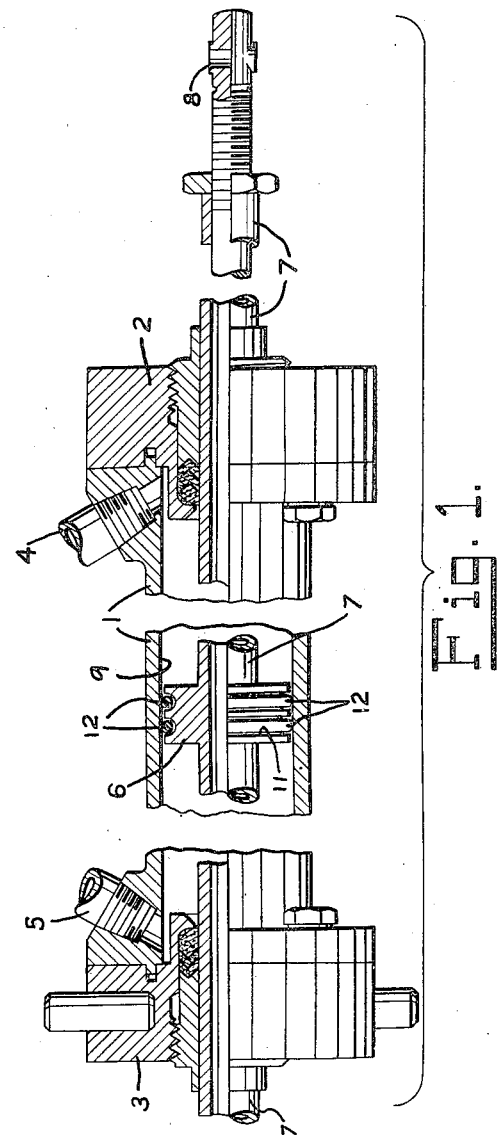

2,314,683

UNITED STATES PATENT OFFICE 2,314,683

PISTON SEALING ASSEMBLY

Mitchell M. Berry, Seattle, Wash., assignor to Boeing Aircraft Company, Seattle, Wash., a corporation of Washington Application March 3, 1941, Serial No. 381,467

7 Claims. (Cl. 309—23)

Airplane control surfaces, flaps, and the like are frequently operated by hydraulic boost cylinders, which, because they must be small, compact, and light, are subjected to reasonably high pressures to produce a force sufficient to overcome the rather considerable aerodynamic loads upon the surface to be operated. Wheel brakes are similarly operated, and here, too, the loads are large yet the cylinder should be small and light. Sometimes such boost cylinders are double-acting, and sometimes they are single-acting, operating against a return spring, which, when the hydraulic pressure is relieved, must return the piston to its initial position.

Obviously any resistance created by friction of the piston moving within the cylinder, or, what is the same thing, the piston packing or sealing rings moving over the cylinder wall, requires just that much more hydraulic force in addition to the force necessary to overcome the applied loads, to move the control surface, for instance, or to produce the required braking. Where the boost cylinder is double-acting the added force requires a somewhat larger piston and cylinder, but where it is desired to effect return by means of a compression spring or the like the spring must be sufficiently strong and forceful to overcome the friction forces, which in turn requires that the piston must be made sufficiently larger, and must develop sufficient additional force, not only to overcome the friction under load, but also to overcome the stiff spring which in turn must overcome the friction on the return movement. By such multiplication of forces, arising solely from the necessity of overcoming the friction of the piston packing moving within the cylinder wall, such a cylinder is required to be made appreciably larger and heavier than would otherwise be the case, and larger and heavier than is desirable.

As a typical illustration it may be assumed that hydraulic pressure at 750 pounds per square inch is available to operate the plunger of a brake cylinder which conditions of space, weight, etc., limit to 1½ inches diameter, or approximately 1.75 square inches. A total of 1312 pounds can be applied in such a cylinder. If, however, the actual frictional resistance of the piston packing is 175 pounds (a very conservative figure) to contain pressures of this magnitude, the useful force is 1312 pounds—175 pounds, or 1137 pounds, a friction loss of over 13%. But let us suppose that this force must be applied against a return spring which necessarily must have a force, when least loaded, in excess of the frictional resistance—say 200 pounds. Such a spring when fully loaded may have a force of 750 pounds, particularly if quick return is essential, with no material time lag as the spring approaches its least loaded position. The actual figure, of course, depends upon many factors, but the figure assumed is by no means excessive; the situation is hypothetical, only in that such a range of variation in spring loading could scarcely be obtained in a small cylinder. In an actual design the spring had to be divided into eight individual springs to obtain the necessary range of spring force within a given length; the added weight, size, and expense thereby required is self-evident.

By such a spring, loaded to 750 pounds, the useful force is further reduced from 1137 pounds, leaving a useful force of 387 pounds. There has been a loss of 925 pounds, or about 71%; expressed otherwise, the cylinder, in order to deliver 387 pounds of useful force, has had to be made nearly 3½ times as large. These results are traceable directly to the large frictional resistance of the piston packing. In one actual instance, a wheel brake boost cylinder for an airplane, the cylinder sizes had to be multiplied eight times, for this reason alone—obviously an impractical arrangement.

I have discovered a piston packing arrangement which so reduces the frictional resistance that this becomes negligible, and does not affect design calculations. In a boost cylinder comparable to the one used above as an illustration, the total frictional resistance does not exceed 5 pounds, when pressure is relieved. The return spring, if used, need not be largely in excess of 5 pounds when least loaded, hence a slight spring correspondingly weaker when fully loaded will produce the necessary rapidity of return movement. The entire force absorbed in overcoming and loading the spring need not be over 50 pounds, leaving available, in the same typical cylinder, 1312–50 or 1272 pounds of useful force—a gain of about 330% over the arrangement previously discussed. It is evident that such an improved boost cylinder can be made materially smaller and lighter.

Some such boost cylinders, instead of being spring-returned, are double-acting, as has been noted, but are connected directly in the mechanical connections from a manual control to the control surface, a rudder, for instance, the purpose being to provide a direct mechanical connection for the pilot's use in the event of failure of the operating pressure. In such installations, regardless of size or weight, reduction of friction to the minimum is necessary in order that, under normal conditions, the rudder will return to neutral position solely under the influence of the aerodynamic loads upon it, even at low air speeds when these loads are smallest, and in order that the pilot be not required to use opposite rudder, in order to return the rudder to neutral. A rudder requiring such positive return to neutral would, at take-off, cause the airplane to zigzag dangerously, for the airspeed is low and the pilot is busy otherwise. Reduction of friction to the minimum, in the case of such a direct-connected boost cylinder, is also extremely necessary in order that the pilot may manually operate the controls in the event of failure of operating pressure. By the nature of things, the aerodynamic loads are high if a boost cylinder is normally required, and a pilot will have to exert great muscular force to overcome these aerodynamic loads, and must not be forced to overcome additionally large frictional loads.

The above indicates the general objects of my discovery or invention, and in addition it is an object to provide an arrangement of the nature indicated which will be durable and inexpensive, both as to maintenance and as to initial construction.

The hydraulic boost cylinder of an airplane control surface, and the wheel brake boost cylinder, have been used as an illustration of the principles and advantages of my invention, but it should be understood that these principles are applicable to a variety of installations, and for a variety of uses, and that in such installations and uses the same advantages will be equally valuable.

With the above in mind my discovery or invention comprises the novel relative arrangement of the parts of such a seal, as shown in the accompanying drawings and as will be more fully explained hereafter.

Figure 1 is a part section, part elevation, of a direct-connected boost cylinder, incorporating my discovery.

Figure 2 is an enlarged sectional detail of the seal, under no-load conditions, and Figure 3 is a similar view, under pressure conditions.

Figure 4 is an axial section of a boost cylinder with return spring, and incorporating my discovery both in the high-pressure and in the low-pressure ends.

Figure 5 is a diagram of such a boost cylinder incorporated within a wheel brake operating system.

In Figure 1 the invention is illustrated as embodied in a double-acting boost cylinder, illustrated generally at 1, and having the heads 2 and 3 with the respective fluid connections 4 and 5. Within this cylinder a piston 6 is slidable. In the arrangement shown it is provided with a piston rod 7 extending through the heads 2 and 3, and having means as indicated at 8 for connection to control cables or the like. Suitable packing is provided around the piston rod where it passes through the heads, and while packing which will produce a minimum of friction is desirable at these points, the frictional bearing is appreciably smaller than the bearing of the piston packing within the cylinder wall, hence the packing about the rod 7 does not produce an undue amount of friction. However, it should be borne in mind that the principles of the present invention may be applied at this point, if desired, and that the arrangement now to be described in detail can be reversed in so applying these principles.

As is normal, and as is shown in Figures 2 and 3, the piston 7 is provided with some clearance within the cylinder wall 9. The piston itself, which may be a solid piston, integral with the piston rod, is circumferentially grooved; the number of grooves is unimportant. This construction is cheap and simple, yet effective, since variation of the size of the groove is not only unnecessary, but undesirable. The grooves are round-bottomed, as indicated at 10, and have straight walls 11, hence are easily machined. Within each such groove is received a sealing ring 12, which has a round cross-section, the cross-sectional radius of which is preferably slightly less than the radius of the bottom 10 of the groove, and the cross-sectional diameter of which is not greater than, but preferably slightly less than, the width of the grooves. There is a preferred relationship between the radius of the round bottom 10, the depth of the groove as a whole, and the spacing of its bottom from the cylinder wall 9, which will be pointed out shortly. The straight walls 11 at opposite sides of the groove are preferably parallel, that is, without any relative angularity, although under some conditions slight angularity may be permitted.

The ring is of a material which is substantially incompressible, but deformable and resilient. Synthetic rubber substances, such as neoprene, are particularly advantageous for such rings, and particularly where they are subjected to the action of oil.

The external diameter of such ring, when seated in an outwardly facing groove as illustrated, and within a smooth inner wall, is slightly greater than the diameter of the wall 9. The reason for this is that in inserting the ring within the cylinder it is thereby crowded inwardly very slightly to insure that it maintains contact with the wall 9. This difference is approximately .010" in an installation wherein the piston is 1.500" in diameter. By this expedient the ring maintains a substantially line contact with the wall 9, about the ring's greatest diameter, under no-load conditions, yet the slight force produced by this crowding produces no appreciable friction.

The internal diameter of the ring 12 is so chosen, with relation to the depth of the piston's groove, the internal diameter of the wall 9, and the clearance between the piston 6 and the wall 9, that even when thus crowded in, the ring does not contact the bottom of the rounded portion 10 of the groove under no-load conditions. Since the cross-sectional radius of the ring is slightly less than the radius of the rounded bottom 10 the ring 12 is actually loose in its groove. However, if the piston is moved in the direction of the arrow A there will be contact effected between the ring 12 and one wall only of the groove, which contact will be somewhere in the vicinity of the circle of tangency between the round bottom 10 and the straight wall 11. The circle of contact between the ring and the groove may be slightly outward of this circle of tangency, but the ring must not be of such materially less cross-sectional radius than the radius of the rounded bottom 10, nor spaced too greatly away from the rounded bottom, that the circle of contact referred to is materially outwardly of the circle of tangency. In a typical installation the cylinder is 1.530" inside diameter, the outside diameter of the piston is 1.500", and the diameter at the bottom of the groove is 1.145", with a groove having the radius .110", and the ring having a cross-sectional diameter of .187" and an outside circumferential diameter, relaxed, of 1.540".

It will be evident that the contact of the side of the ring 12 with the groove produces no friction which resists movement of the piston within the cylinder, and the only frictional resistance is that resulting from the line contact of the greatest circumference of the ring with the cylinder wall, and this is extremely slight. The contact of the side of the ring within the groove merely serves to prevent rolling of the ring about the circle of its cross-sectional center, as it moves along within the cylinder.

When pressure is applied, as indicated by the arrow P, this pressure acts through the clearance between the piston and cylinder wall, and reacts also from the bottom of the groove, urging the ring 12 outwardly against the cylinder wall. Such pressure deforms the ring. Since the ring is but slightly smaller than the groove which receives it, and fails by but a small amount to touch the bottom of the groove, any material deformation causes the ring to seat on the rounded bottom of the groove over a material breadth or area, and its deformation in this direction is immediately halted, whereupon its further deformation merely tends to flatten it radially of the piston, and hence to expand its outer circumference into a broad band of contact with the cylinder wall 9. This condition is shown in Figure 3. The greater the pressure the greater the deformation of the ring, and the tighter the seal. Naturally the friction increases, but ample pressure can be supplied to overcome this friction, which in no event is a considerable factor, and particularly when the friction under no-load conditions is almost non-existent.

Mention has been made that the groove walls I are preferably parallel. If made slightly outwardly diverging there would be a tendency to wedge the ring between the groove wall 11 and the cylinder wall 9. This might produce a thoroughly tight seal, but the wedging might be so tight that the ring would stick, and might be damaged or worn by reversal of the piston's movement. Moreover, there has appeared no lack of adequate seal with straight, parallel-sided grooves, hence divergence of the groove walls appears unnecessary. If it is desired or required to flare these walls, however, the principles of my discovery are equally useful and applicable for sealing.

In Figure 4 the rings 12 and 12' are shown applied to the high pressure and low pressure pistons 6 and 6' within the cylinders I and I', respectively. The grooves in the low-pressure piston are identical with those already described, while the groove 14 in the high pressure piston 6 is flat-bottomed, but inclined, at the side opposite the application of pressure, in such manner that the ring 12 will be forced outwardly under the influence of pressure. Still, there is no wedging action, for the inclined groove wall moves away from, not towards, the ring under pressure conditions. Return is under the influence of a spring 15. If the frictional resistance were large, this spring would have to be correspondingly heavier, and could not be contained within the cylinder.

The boost cylinder I, I' is part of a wheel brake system, used to illustrate the manner in which the seal contributes to effectiveness, with compactness and lightness. The system, illustrated in Figure 5, includes the pedal operated valve 20 controlling admission of pressure to the cylinder I and relief therefrom. Pressure admitted to the cylinder I is transmitted to liquid in the cylinder I', and thence to an inflatable annulus 21 located between a fixed rim 22 and a rotatable wheel drum 23; brake lining 24 is thereby urged against the rotating wheel drum. This must release practically instantaneously, wherefore the return spring 15 must have sufficient force, when least loaded, to accomplish such instantaneous release.

In a boost cylinder of the double-acting type, shown in Figure 3, the frictional resistance is so reduced, under no-load conditions, that the piston and its rod will fall of their own weight (perhaps two pounds) if placed with the axis vertical, yet will withstand 2500 pounds per square inch pressure, in an inch and a half cylinder. In a cylinder of the single-acting type, with return spring, as in Figure 4, a spring force of only five pounds is ample to return the parts to their initial position, although some additional force may be required, as has been suggested, if substantially instantaneous return is essential.

What I claim as my invention is:

1. In combination with a cylinder and a circumferentially grooved piston guided for axial movement therein, sealing means in said groove comprising a ring of resilient, deformable, but substantially non-compressible material of circular cross-section; the relative diametral sizes of the ring, groove bottom, and cylinder wall, and the cross-sectional diameter of the ring relative to the width of its groove, being so chosen that, under no load, the ring is substantially undeformed cross-sectionally, is reduced in diametral extent only sufficiently to insure a circumferential line bearing of the ring upon the cylinder wall, and the ring bears within the groove at one side only, but has its internal circumference but slightly spaced from the bottom of the groove; but likewise so chosen that under pressure loading the ring is flattened against the side of the groove and expanded in radial directions, thereby effecting contact with the bottom and side wall of the groove, to limit its expansion inwardly, and thereby to effect its expansion outwardly, and its contact with the cylinder wall along a broad band.

2. In combination with a cylinder and a circumferentially grooved piston guided for axial movement therein, sealing means in said groove to seal against high pressure, yet without material frictional resistance under no-load conditions, said groove being substantially straight-sided and of round-bottomed cross-section, and said sealing means comprising a ring of resilient, deformable, but substantially non-compressible material of circular cross-section; the relative cross-sectional radii of the ring and groove bottom, and the relative diametral sizes of the ring, groove, and cylinder wall, being so chosen that, under no load, the ring is substantially undeformed cross-sectionally, is reduced in diametral size only sufficiently to insure a circumferential line bearing upon the cylinder wall, and has no bearing within the groove other than along a line at one side only of the groove, and above the bottom of the groove; but under pressure loading the flattening deformation of the ring in the direction of pressure effects its corresponding expansive deformation in a direction radially of the piston, thereby effecting contact with the curved bottom and side wall of the groove about a broad band, and with the cylinder wall likewise along a broad band.

3. In combination with a cylinder and a circumferentially grooved piston guided for axial movement therein, sealing means in said groove to seal against high pressure, yet without material frictional resistance under no-load conditions, said groove being substantially parallel-sided and of round-bottomed cross-section, and said sealing means comprising a ring of resilient, deformable, but substantially non-compressible material of circular cross-section; the cross-sectional radius of the ring being slightly less than the radius of the groove's bottom, the ring's external diameter being slightly greater than the diameter of the cylinder wall, and the ring's internal diameter being sufficiently greater than the diameter of the bottom of the groove that, when the ring bears upon the cylinder wall, under no-load conditions, it bears upon the groove outwardly of the groove's smallest diameter, and at one side only, due to the lesser cross-sectional radius of the ring.

4. In combination with two cylindrical elements having slight clearance for frictionless sliding one within the other, one such element being smooth-walled and the other having a circumferential groove which is straight-sided and round-bottomed in cross-section, and a sealing ring of resilient, deformable, but non-compressible material received in said groove, the diameter of said ring which corresponds with the diameter of the smooth-walled element being sufficiently different from such element's diameter that by slight diametral deformation the ring is caused to bear with a substantially line contact upon the smooth wall of the element, the ring being round in cross-section, and of cross-sectional radius less than the radius of the round bottom of the groove, the diametral size of the groove's bottom being so chosen, relative to the diametral size of the corresponding circumference of the ring, that when the ring is not deformed by pressure loading these two diameters are slightly spaced from contact, but when the ring is subjected to deformation by pressure it bears over a material breadth of the round bottom of the groove.

5. In combination with a cylinder and a circumferentially grooved piston having a clearance fit therein, a seal therebetween comprising a ring of resiliently deformable material of generally circular cross-section received within the groove, the ring when undeformed having an external circumference minutely greater than the internal circumference of the cylinder wall, so that the ring when installed seats entirely about its external circumference, but is contracted negligibly, and the ring having an internal circumference slightly greater than the circumference of the bottom of the groove, the relative size and shape of the ring and groove being such that when the ring is thus installed it is not squeezed between the sides of the groove, and does not contact the bottom of the groove, under no-load conditions, and hence is not urged outwardly, but such that under fluid pressure the ring will tend to expand radially of the cylinder, to press against the cylinder wall and against the bottom of the groove, and correspondingly to contract lengthwise of the cylinder and to press against a side wall of the groove.

6. The combination of claim 5, wherein the groove has a width slightly in excess of the normal cross-sectional diameter of the ring.

7. The combination of claim 5, wherein the bottom of the groove is rounded similarly to, but on a radius slightly exceeding the ring's cross-sectional radius, and further characterized in that the sides of the groove are everywhere spaced at least slightly more than the cross-sectional diameter of the ring.

MITCHELL M. BERRY.